United States Patent
Paul

(10) Patent No.: US 10,947,379 B2
(45) Date of Patent: Mar. 16, 2021

(54) FLAME RETARDANT ADDITIVE FOR POLYMERS

(71) Applicant: PP POLYMER AB, Vällingby (SE)

(72) Inventor: Swaraj Paul, Spånga (SE)

(73) Assignee: PP POLYMER AB, Vällingby (SE)

( * ) Notice: Subject to any disclaimer, the term of this patent is extended or adjusted under 35 U.S.C. 154(b) by 62 days.

(21) Appl. No.: 16/228,995

(22) Filed: Dec. 21, 2018

(65) Prior Publication Data
US 2019/0127568 A1    May 2, 2019

Related U.S. Application Data

(63) Continuation of application No. PCT/SE2017/050636, filed on Jun. 14, 2017.

(30) Foreign Application Priority Data

Jun. 21, 2016 (SE) .................................. 1650882-2

(51) Int. Cl.
| | | |
|---|---|---|
| C08L 33/08 | (2006.01) | |
| C08L 33/10 | (2006.01) | |
| C08K 5/52 | (2006.01) | |
| C08K 5/053 | (2006.01) | |
| C08K 3/22 | (2006.01) | |
| C08K 3/26 | (2006.01) | |
| C09K 21/02 | (2006.01) | |
| C09K 21/14 | (2006.01) | |
| C09K 21/10 | (2006.01) | |
| C09K 21/12 | (2006.01) | |

(52) U.S. Cl.
CPC ................ *C08L 33/08* (2013.01); *C08K 3/22* (2013.01); *C08K 3/26* (2013.01); *C08K 5/053* (2013.01); *C08K 5/5205* (2013.01); *C08L 33/10* (2013.01); *C09K 21/02* (2013.01); *C09K 21/10* (2013.01); *C09K 21/12* (2013.01); *C09K 21/14* (2013.01); *C08K 2003/2224* (2013.01); *C08K 2003/2227* (2013.01); *C08K 2003/265* (2013.01); *C08K 2003/267* (2013.01); *C08L 2201/02* (2013.01)

(58) Field of Classification Search
CPC . C08K 3/22; C08K 5/52; C08K 5/053; C08K 3/26; C08L 33/08; C08L 33/10
USPC .......................................................... 252/609
See application file for complete search history.

(56) References Cited

U.S. PATENT DOCUMENTS

| | | |
|---|---|---|
| 2002/0096669 A1 | 7/2002 | Van Der Spek et al. |
| 2006/0217469 A1 | 9/2006 | Bauer et al. |
| 2008/0224105 A1 | 9/2008 | Green et al. |
| 2015/0004402 A1 | 1/2015 | Tas et al. |

FOREIGN PATENT DOCUMENTS

| | | |
|---|---|---|
| SE | 529073 C2 | 2/2007 |
| WO | 2008051120 A1 | 5/2008 |
| WO | 2011/080364 A1 | 7/2011 |

*Primary Examiner* — Deve V Hall
(74) *Attorney, Agent, or Firm* — Gabriela B. Tomescu, Esq.; Bergenstråhle & Partners AB

(57) ABSTRACT

The present disclosure relates to a halogen-free flame retardant additive for polymers, such as polyolefins, comprising (i) a phosphorous-nitrogen-containing component containing amine and/or ammonium groups; and (ii) a (meth)acrylic acid homo- or co-polymer selected from the group consisting of a partially or fully neutralized salt of poly((meth)acrylic acid), a partially or fully neutralized salt of a partially crosslinked poly((meth)acrylic acid), a partially or fully neutralized salt of a copolymer of an olefin and (meth)acrylic acid comprising at least 50% by weight of (meth)acrylic acid repeating units, and any combinations of the foregoing polymers. The present disclosure also relates to a flame retardant polymer composition comprising the flame retardant additive and a method of reducing the flammability of a polymer, in particular a polyolefin, using the flame retardant additive.

22 Claims, 1 Drawing Sheet

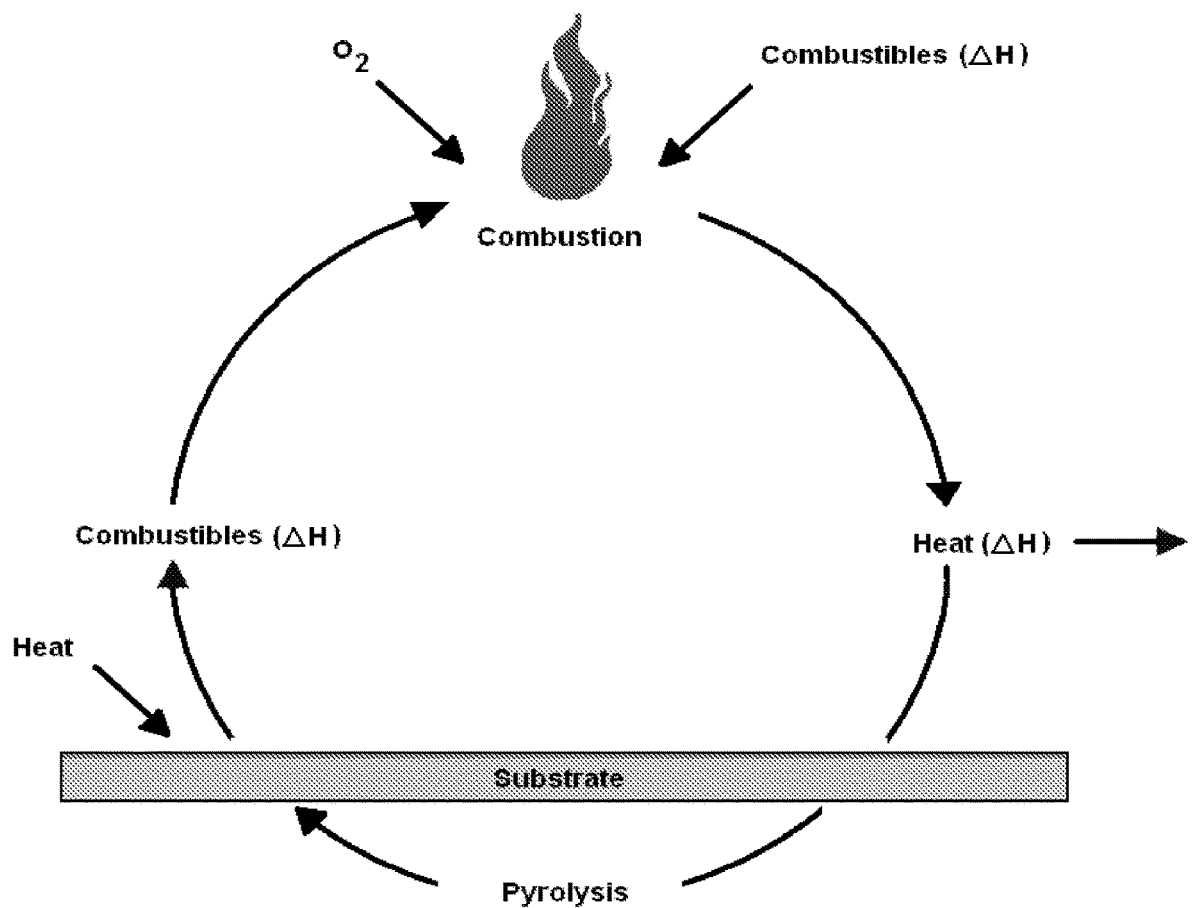

FLAME RETARDANT ADDITIVE FOR POLYMERS

This application is the continuation of International Application No. PCT/SE2017/050636, filed 14 Jun. 2017, which claims the benefit of Swedish Patent Application No. SE 1650882-2, filed 21 Jun. 2016, the entire contents of which are hereby incorporated by reference.

TECHNICAL FIELD

The present disclosure relates to a flame retardant additive, a flame retardant polymer composition and a method of reducing the flammability of a polymer, in particular a polyolefin.

BACKGROUND

Almost all polymeric materials are comprised of organic materials. The major shortcoming of polymeric materials is their burning characteristics. The flammability of some polymers is higher than wood and natural fibres. The calorific values for some common polymers such as polyethylene, polypropylene, polystyrene, polymethylmethacrylate are 27000-46000 kJ/kg, whereas this value for wood is 19000 kJ/kg. In addition, smoke and soot formation, droplets and emission of highly toxic products accompany the combustion of some polymer materials. Thus, the wide application of polymer material makes it necessary to develop flame-retarded materials.

An important way to obtain flame-retarded polymeric materials is to add suitable types of flame-retardant additives. Flame retardants may be mixed with the base polymer (additive flame retardants) or chemically bonded to it (reactive flame retardants). The flame-retarding influence of such additives is mainly controlled by the mechanisms by which these additives interact with the base polymer and thereby reduce its flammability.

A typically burning cycle for polymer materials is illustrated in FIG. 1. As evident from FIG. 1, heat generated under fire conditions results in pyrolysis of the polymeric material forming combustible gases. These combustible gases, in presence of oxygen, create flame and smoke. Since combustion is an exothermic process, it generates more heat resulting in more pyrolysis of the polymers and thereby supplying more fuel to the fire. This means that as soon as the material starts burning, the flame reaction just accelerates and is difficult to stop resulting into flash over.

The above process sequence suggests that in order to reduce the flammability of polymers, following measures are required:
1. Increase the thermal stability of polymers.
2. Increase the amount of char formation as a result of burning.
3. Decrease the diffusion of combustible gases from the polymer, formed as a result of pyrolysis, to the flame.
4. Reduce the amount of heat generated as a result of burning.
5. Insulate the polymer surface in order to reduce transfer of heat from the fire to the polymer material.
6. Polymer together with flame retardant additive on degradation under burning conditions generates inert gases.

This suggests that in order to control the flammability of polymer materials under a fire situation, it is essential to control both the condensed-phase reactions taking place in the polymer and the gas-phase reactions under fire conditions. Condensed-phase reactions in the polymers means that the flame retardant additives helps to achieve the measures considered under points 1, 2, 3 and 5 summarized above and thereby changes the pyrolytic path of the polymer under burning conditions. The latter reduces the formation of combustible gases, which in turn result into less heat generation and thereby reduces material flammability.

It is known from the ancient Egyptian time to obtain flame retardancy of wood using phosphorus. Thus, use of phosphorous-containing compounds as well as phosphorous-, nitrogen- and phosphorous-nitrogen-containing compounds as flame retardant additives is well-known within the art. Examples of references relating to the use of such compounds are U.S. Pat. Nos. 5,137,937; 4,073,767; EP 0530874 B1; EP 0363321 B1; U.S. Pat. No. 5,985,960 and WO 2010/0026230.

U.S. Pat. No. 4,174,343 discloses a composition comprising a polyolefin and self-extinguishing, non-dripping amount of a combination of a pentaerythritol diphosphonate compound and ammonium polyphosphate. The combination of pentaerythritol diphosphonate compound and ammonium polyphosphate is added in an amount of 20-40% by weight, based on the weight of the composition.

EP 0343109 A1 discloses a composition comprising a halogen-free polymer and as flame retardant at least one metal or metalloid salt of a polyphosphonic acid having a certain structure and a mono- or polycarboxylic acid or a metal or metalloid salt thereof. Examples of polycarboxylic acids include poly(acrylic acid), polymaleic acid, copolymers of ethylene and acrylic acid and copolymers of maleic acid and styrene. The metal or metalloid salt of a polyphosphonic acid may be halogenated. Examples of polymers which may be rendered flame retardant are polyphenylene oxides and sulfides, polyurethanes, polyamides, polyesters, polystyrene, graft copolymers of styrene, crosslinked epoxide resins and polycarbonates.

EP 1189980 B1 discloses a halogen-free, flame-retardant composition comprising at least either an organic phosphorous compound, melamine or a compound derived from melamine or a melamine-phosphorous compound, and a polymer comprising at least one type of olefin having 2-12 carbon atoms and 0.1-30 weight % of at least one compound containing acid, acid anhydride or epoxy group.

EP 1095030 discloses the use of a polyphosphate salt of a 1,3,5-triazine compound as flame retardant in polymer compositions. Examples of substances known to reinforce the flame retardant action of the triazine derivative polyphosphate are mentioned to be phenol resins, epoxy resins, melamine resins, alkyd resins, allyl resins, unsaturated polyester resins, silicon resins, urethane resins, acrylate resins, starch, glucose, and compounds with at least two hydroxy groups.

WO 2008/051120 discloses a flame retardant additive for polymers comprising a polyacrylate, which may be a salt of poly(acrylic acid) or a crosslinked poly(acrylic acid), in combination with a) at least one zinc borate, b) at least one silicone resin, and c) alumina trihydrate or magnesium hydroxide or a mixture thereof, the additive being free of halogens, antimony oxide and phosphorus-containing substances.

Cervantes et al 2006 (Polymer Degradation and Stability, 91, 3312-3321) proposed the reaction scheme of Scheme 1 from a study on the degradation of polyacrylates containing carboxylic acid groups. The reaction scheme of Scheme 1 shows that the adjacent carboxylic groups present in the polymers undergo dehydration reaction forming anhydrides. These anhydrides undergo a series of degradation reactions forming double bonds and cyclic aromatic structures. In their studies it was also shown that the types of end products that are formed as a result of thermal degradation are very much dependent on the chain lengths of the alkyl groups separating carboxylic and the carbonyl group and also if the alkyl groups are substituted with an aromatic group.

Without being bound by any theory, it is believed that the presence of double bonds might favor the formation of desired cross-links between the chains resulting into a charred network. It is also believed that formation of aromatic rings might enhance the thermal stability of the polymers. Both of the proposed routes seem to be very Scheme 1: Degradation mechanisms for polymers containing acidic groups

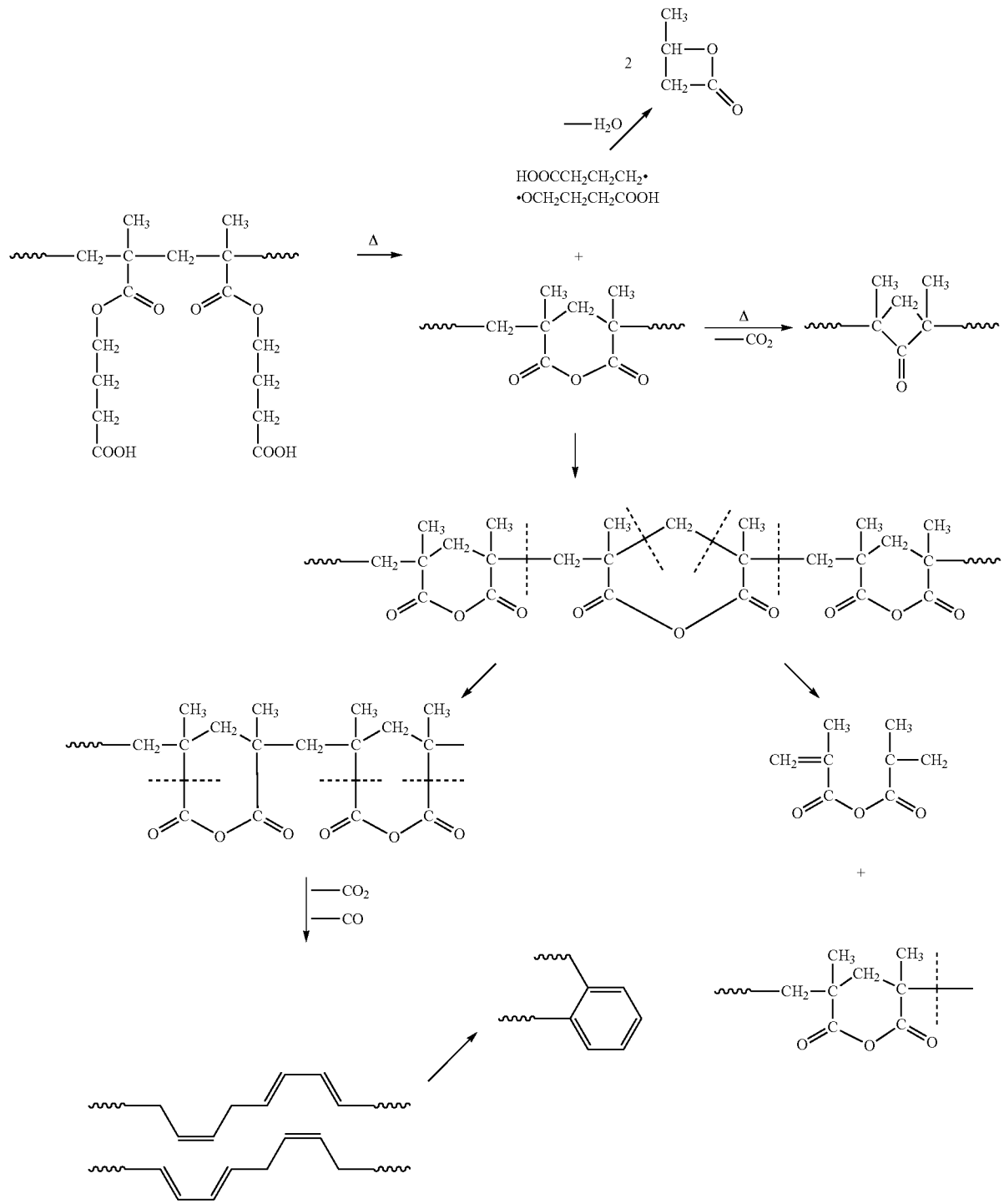

favorable to obtain the desired condensed phase reactions in the polymers, which may be favorable to obtain good fire-resistance properties.

Ebdon et al 2000 (Polymer Degradation and Stability, 70, 425-436) reported a degradation study where phosphorus was integrated as part of the polymer and proposed following reaction scheme (Scheme 2) for the degradation of methylmethacrylate (MMA) copolymers with phosphorus derivatives such as diethyl methacryloyloxymethyl)-phosphonate (DEMMP)

Scheme 2: Suggested condensed phase reactions in MMA-DEMMP copolymers during thermal degradation

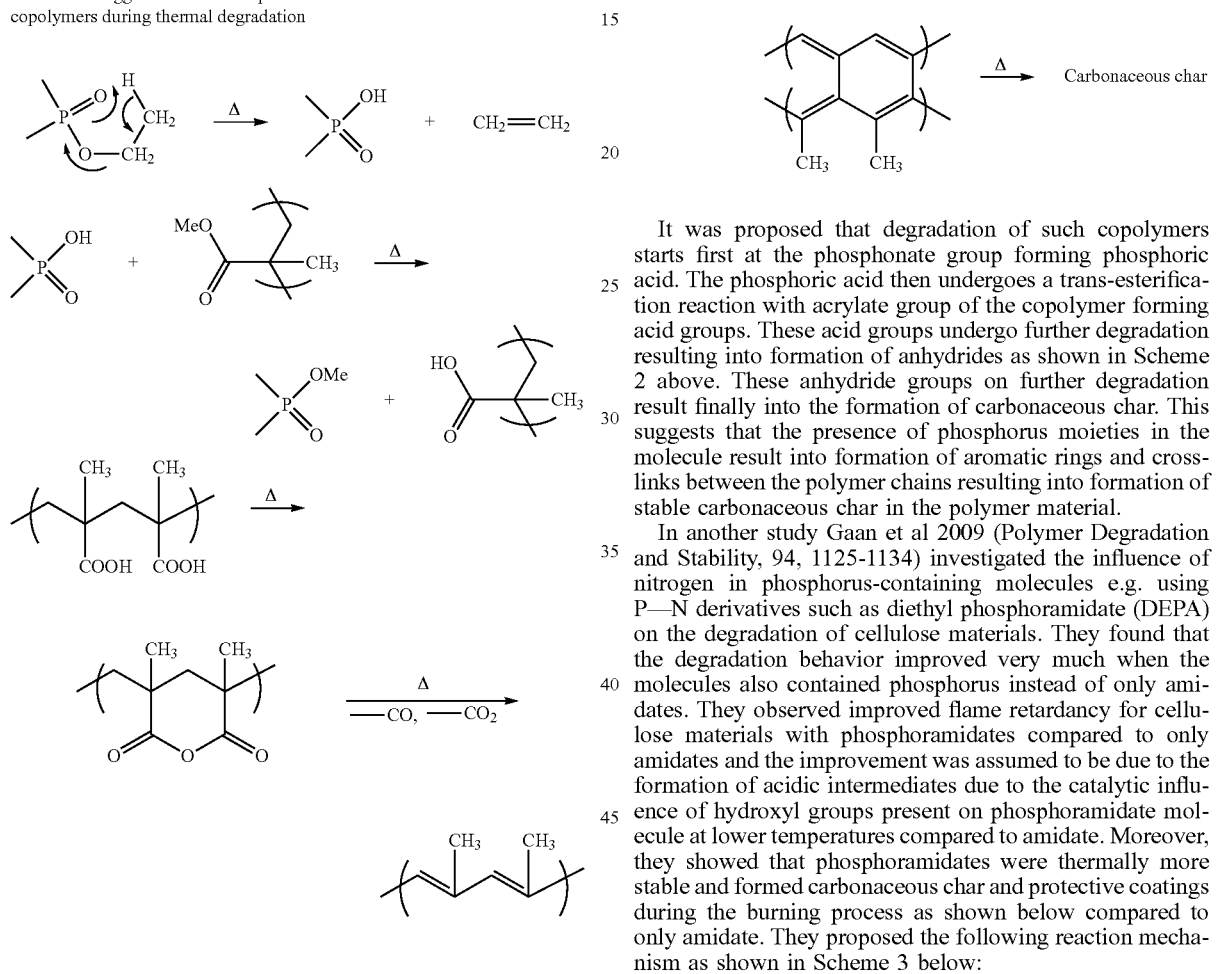

It was proposed that degradation of such copolymers starts first at the phosphonate group forming phosphoric acid. The phosphoric acid then undergoes a trans-esterification reaction with acrylate group of the copolymer forming acid groups. These acid groups undergo further degradation resulting into formation of anhydrides as shown in Scheme 2 above. These anhydride groups on further degradation result finally into the formation of carbonaceous char. This suggests that the presence of phosphorus moieties in the molecule result into formation of aromatic rings and cross-links between the polymer chains resulting into formation of stable carbonaceous char in the polymer material.

In another study Gaan et al 2009 (Polymer Degradation and Stability, 94, 1125-1134) investigated the influence of nitrogen in phosphorus-containing molecules e.g. using P—N derivatives such as diethyl phosphoramidate (DEPA) on the degradation of cellulose materials. They found that the degradation behavior improved very much when the molecules also contained phosphorus instead of only amidates. They observed improved flame retardancy for cellulose materials with phosphoramidates compared to only amidates and the improvement was assumed to be due to the formation of acidic intermediates due to the catalytic influence of hydroxyl groups present on phosphoramidate molecule at lower temperatures compared to amidate. Moreover, they showed that phosphoramidates were thermally more stable and formed carbonaceous char and protective coatings during the burning process as shown below compared to only amidate. They proposed the following reaction mechanism as shown in Scheme 3 below:

Scheme 3: Degradation mechanism for phosphoamidates

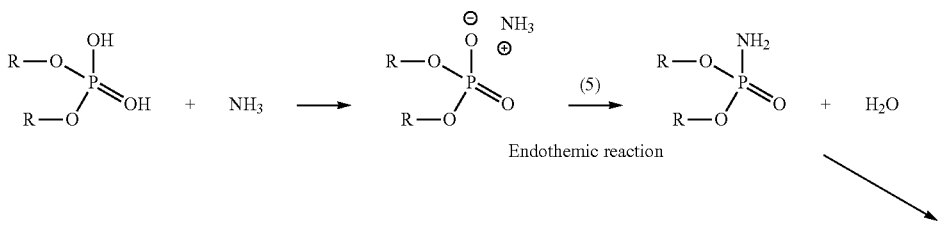

Endothemic reaction

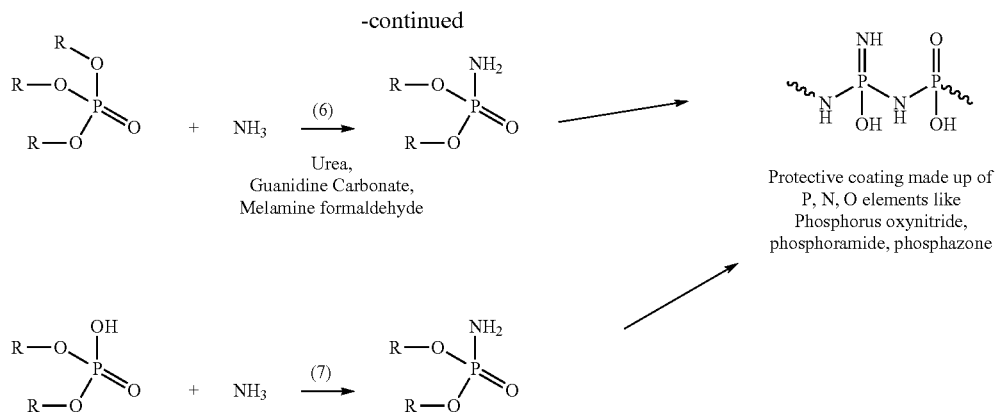

Besides being flame retardant, being free from hazardous and persistence substances, such as halogens and antimony oxides, and not generating toxic fumes and smoke during burning, it is also important that flame retardant polymer compositions exhibit resistance to formation of burning molten drops (flaming particles) when they do burn in order to prevent ignition of surrounding combustible materials. Therefore, polymer compositions, such as polyolefin compositions, should preferably be non-dripping as well as self-extinguishing. Rather large amounts, such as about 30-35% by weight of the polymer composition, of existing flame retardant additives may be needed in order to obtain self-extinguishment. Large amounts of flame retardant additives may be required just to achieve the flame extinguishing property and such large amount generally have a negative impact on the mechanical and rheological properties of the polymer to which the halogen-free flame retardant additive is added.

Thus, there is a need for halogen-free flame retardant additives for polymer compositions, in particular polyolefin compositions, which improve the burning behavior, such as decreasing or eliminating dripping and decreasing peak heat release rate (PHR) of polymers, while essentially preserving the properties, in particular the mechanical and rheological properties, of the polymer to which the halogen-free flame retardant additive is added.

SUMMARY OF THE INVENTION

An object of the present invention is to alleviate one or more of the problems discussed above, and to provide advantages and aspects not provided by hitherto known halogen-free flame retardant additives for polymers, in particular polyolefins.

According to a first aspect, there is provided a halogen-free flame retardant additive for polymers, in particular polyolefins, comprising:
(a) a phosphorous-nitrogen-containing component containing amine and/or ammonium groups; and
(b) a (meth)acrylic acid homo- or co-polymer selected from the group consisting of a partially or fully neutralized salt of poly((meth)acrylic acid), a partially or fully neutralized salt of partially crosslinked poly((meth)acrylic acid), a partially or fully neutralized salt of a copolymer of an olefin and (meth)acrylic acid comprising at least 50% by weight of (meth)acrylic acid repeating units, and any combinations of the foregoing polymers.

The partially or fully neutralized salt of partially crosslinked poly((meth)acrylic acid) may comprise branched polymers including difunctional structural units forming the main chain, trifunctional structural units at each branch point and tetrafunctional structural units forming crosslinks between polymer chains. The total amount of tri- and tetrafunctional structural units per 100 weight parts structural units may be up to about 10% by weight in the partially or fully neutralized salt of partially crosslinked poly((meth) acrylic acid) of the flame retardant additive as disclosed herein.

The (meth)acrylic acid homo- or co-polymer of the flame retardant additive as disclosed herein may be a (meth)acrylic acid homopolymer selected from the group consisting of a partially or fully neutralized salt of poly((meth)acrylic acid), a partially or fully neutralized salt of a partially crosslinked poly((meth)acrylic acid) and any combinations thereof.

The partially or fully neutralized salt of poly((meth) acrylic acid) of the halogen-free flame retardant additive as disclosed herein may be a partially neutralized salt of poly(acrylic acid), such as partially neutralized poly(acrylic acid sodium salt).

The halogen-free flame retardant additive as disclosed herein may comprise:
(i) at least one (meth)acrylic acid homopolymer selected from the group consisting of a partially or fully neutralized salt of poly((meth)acrylic acid) and a partially or fully neutralized salt of a partially crosslinked poly ((meth)acrylic acid); and
(ii) a partially or fully neutralized salt of a copolymer of an olefin and (meth)acrylic acid comprising at least 10% by weight of (meth)acrylic acid repeating units, such as partially neutralized salts of poly(ethylene-co-acrylic acid) and partially neutralized salts of poly (ethylene-co-methacrylic acid).

When at least one (meth)acrylic acid homopolymer selected from the group consisting of a partially or fully neutralized salt of poly((meth)acrylic acid) and a partially or fully neutralized salt of a partially crosslinked poly((meth) acrylic acid) is present in the flame retardant additive as disclosed herein, the partially or fully neutralized salt of copolymer of an olefin and (meth)acrylic acid may comprise at least 10% by weight, such as 15% by weight, of (meth) acrylic acid repeating units.

Specific examples of such copolymers are partially neutralized poly(ethylene-co-acrylic acid) sodium salt and partially neutralized poly(ethylene-co-methacrylic acid) zinc salt.

It has been found that the halogen-free flame retardant additive as disclosed herein when added to polymers, in particular olefin polymers, decreases or eliminates dripping of the polymers upon burning thereof. Addition of a partially or fully neutralized salt of poly((meth)acrylic acid) or a partially or fully neutralized salt of partially crosslinked poly((meth)acrylic acid) has been shown to increase the efficiency of existing flame retardant phosphorous-nitrogen-containing components containing amine and/or ammonium groups. This means that lower amounts of flame retardant additive is needed in order to attain the desired effect and the mechanical and rheological properties of the polymer, such as polyolefins, to which the halogen-free flame retardant additive is added may be essentially preserved.

By using the flame retardant additive as disclosed herein, flame retardancy is obtained by controlling both the gas-phase and condensed phase of the base polymer to which this additive is added. It has surprisingly been found that presence of carboxylic functionality in the poly((meth)acrylic acid), and in copolymers containing acrylic acid, together with a P—N component as disclosed herein results in cross-linking of the back-bone chain of the base polymers, as explained in more detail below, resulting into formation of dense condensed phase reducing the dripping of molten polymer and also reducing the amount of heat released.

The phosphorous-nitrogen-containing component (P—N component) may comprises one or more phosphorous-nitrogen-containing compounds selected from the group consisting of phosphoric acid derivatives containing amine and/or ammonium groups, phosphonic acid derivatives containing amine and/or ammonium groups, phosphinic acid derivatives containing amine and/or ammonium groups, and any combinations thereof.

Examples of such phosphorous-nitrogen-containing compounds are ammonium polyphosphate, ethylene diamine phosphate, melamine phosphate, melamine polyphosphate, dimelamine pyrophosphate and piperazine phosphate.

Alternatively, the phosphorous-nitrogen-containing component may comprise one or more phosphorous-containing compounds selected from the group consisting of phosphoric acid derivatives, phosphonic acid derivatives, phosphinic acid derivatives and any combinations thereof; in combination with one or more nitrogen-containing compounds containing amine and/or ammonium groups.

Examples of such phosphorous-containing compounds are pentaerythritol diphosphonate compounds, such as dimethyl pentaerythritol diphosphonate, dibenzyl pentaerythritol diphosphonate, diphenyl pentaerythritol diphosphonate and dinaphtyl pentaerythritol diphosphonate.

Examples of nitrogen-containing compounds containing amine and/or ammonium groups are melamine, melem, 1,3,5-trihydroxyethyl-isocyanurate, and melamine cyanurate.

Still further, the phosphorous-nitrogen-containing component of the flame retardant additive as disclosed herein may comprise one or more phosphorous-nitrogen-containing compounds selected from the group consisting of phosphoric acid derivatives containing amine and/or ammonium groups, phosphonic acid derivatives containing amine and/or ammonium groups, phosphinic acid derivatives containing amine and/or ammonium groups, and any combinations thereof, in combination with one or more nitrogen-containing compounds containing amine and/or ammonium groups.

According to a second aspect, there is provided a halogen-free flame retardant polymer composition, in particular a halogen-free flame retardant polyolefin composition, comprising a flame retardant additive as disclosed herein and at least one polymer, in particular a polyolefin or a polymer blend comprising at least one polyolefin, such as polypropylene or polyethylene, the flammability of which is to be reduced by the flame retardant additive.

The flame retardant additive as disclosed herein may also be added to an acrylic polymer dispersion, thereby providing a flame retardant coating composition, such as a flame retardant paint composition.

According to a second aspect, there is provided a method for reducing the flammability of a polymer, in particular a polyolefin, the method comprising adding the flame retardant additive as disclosed herein to the polymer.

BRIEF DESCRIPTION OF THE DRAWINGS

FIG. 1 shows a typically burning cycle for polymer materials.

DETAILED DESCRIPTION

As used herein, "flame retardant additive" means a combination of one or more compounds intended to be added to a polymer base, such as an olefin polymer, thereby forming a flame retardant composition.

As used herein, "% w/w" or "wt %" or "weight %" refers to weight percent of the ingredient referred to of the total weight of the compound or composition referred to.

As used herein, "(meth)acrylic acid" refers to both acrylic acid and methacrylic acid.

As used herein, "acrylic acid homopolymer" contains repeating units of acrylic acid monomers.

As used herein, "methacrylic acid homopolymer" contains repeating units of methacrylic acid monomers.

As used herein, "amino" refers to the functional group —$NH_2$.

As used herein, "amine" refers to aliphatic amines as well as aromatic amines. Amines includes primary amines, $RNH_2$, secondary amines, HNRR', tertiary amines RNR'R", and cyclic amines. Cyclic amines are secondary or tertiary amines wherein N, R and R' together forms a heterocyclic structure.

As used herein, "amine groups" refers to —$NH_2$ (amino), —NHR, —NRR' and corresponding secondary or tertiary amine groups wherein N, R and R' together forms a heterocyclic structure (cyclic amines).

As used herein, "ammonium" and "ammonium group" refer to $NH_4^+$.

As used herein, "phosphoric acid derivatives" refers to esters and salts of phosphoric acid, which are also called phosphates (including hydrogen phosphates and dihydrogen phosphates) and phosphate esters.

As used herein, "phosphonic acid derivatives" refers to esters and salts of phosphonic acid, which are also called phosphonates.

As used herein, "phosphinic acid derivatives" refers salts of phosphinic acid, which are also called phosphinates.

The halogen-free flame retardant additive for polymers, in particular polyolefins, as disclosed herein comprises:

(a) a phosphorous-nitrogen-containing component containing amine and/or ammonium groups; and (b) a (meth)acrylic acid homo- or co-polymer selected from the group consisting of a partially or fully neutralized salt of poly((meth)acrylic acid), a partially or fully neutralized salt of partially crosslinked poly((meth)acrylic acid), a partially or fully neutralized salt of a copolymer of an olefin and (meth)acrylic acid comprising at least 50% by weight of (meth)acrylic acid repeating units, and any combinations of the foregoing polymers.

The halogen-free flame retardant additive as disclosed herein is particularly useful for polymeric base materials comprising olefinic polymers (polyolefins), such as polyethylene (PE), polypropylene (PP), ethylene vinylacetate (EVA) and other olefin-containing homo- or copolymers.

The halogen-free flame retardant additive as disclosed herein is particularly useful for olefinic homopolymers, such as polypropylene and/or polyethylene.

The halogen-free flame retardant additive as disclosed herein may also be useful for addition to acrylic base polymers, such as acrylic resin dispersions.

The halogen-free flame retardant additive as disclosed herein may also be useful for addition to polymeric base materials comprising acrylonitrile butadiene styrene (ABS), polycarbonate (PC), polyacetal, and polyamides, including nylon.

A halogen-free flame retardant polymer composition is prepared by adding the halogen-free flame retardant additive as disclosed herein to one or more polymers or a polymer composition.

The halogen-free flame retardant polymer composition may be compounded as a concentrated master-batch to be added to a polymer material before manufacturing of flame retarded articles therefrom or as a "ready-to-use" polymer composition for manufacturing of flame retarded articles therefrom. The flame retarded articles may be manufactured using common plastic production technique, such as extrusion, injection molding, blow molding, etc. The flame retardant additive as disclosed herein has been shown to provide fire classifications for injection molded and extruded products and also for fiber applications based on polyolefin materials.

The (meth)acrylic acid homo- or co-polymer of the flame retardant additive as disclosed herein may be a (meth)acrylic acid homopolymer selected from the group consisting of a partially or fully neutralized salt of poly((meth)acrylic acid), a partially or fully neutralized salt of a partially crosslinked poly((meth)acrylic acid), and any combinations thereof.

The (meth)acrylic acid homo- or co-polymer of the flame retardant additive as disclosed herein may be a (meth)acrylic acid homopolymer, such as (i) a partially or fully neutralized salt of poly((meth)acrylic acid) or (ii) a partially or fully neutralized salt of a partially crosslinked poly((meth)acrylic acid).

The partially or fully neutralized salt of poly((meth)acrylic acid) may be a partially or fully neutralized salt of poly(methacrylic acid) or a partially or fully neutralized salt of poly(acrylic acid).

In particular, the halogen-free flame retardant as disclosed herein may comprise a partially neutralized salt of poly((meth)acrylic acid), such as a partially neutralized salt of poly(acrylic acid).

The partially neutralized salt of poly((meth)acrylic acid) may have a neutralization degree within the range of from 5% to 100%, such as within the range of from 50% to 90% or from 70% to 90%.

Poly(acrylic acid), also referred to as PAA, is a homopolymer of acrylic acid monomers.

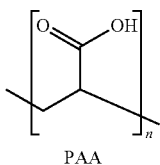

PAA

In a water solution at neutral pH, PAA is an anionic polymer, i.e. the carboxylic groups (COOH) will lose their protons and acquire a negative charge (COO$^-$). Thus, PAA is a polyelectrolyte.

Some or all of the pendant acid groups of PAA may be neutralized by mono-, di- or multivalent cations, in particular metal cations, such as sodium, calcium, magnesium, potassium and zinc, ions.

An example of a salt of PAA is poly(acrylic acid sodium salt).

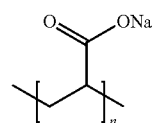

Sodium salt of PAA

Polymers containing salts and esters of acrylic acid monomers may also be referred to as polyacrylates. Thus, poly(acrylic acid sodium salt) may also be referred to as sodium polyacrylate.

Salts of PAA may be fully or partially neutralized. This means that the pendant groups are either carboxylic groups (COOH) or carboxylate groups in salt form (e.g. COONa).

Thus, partially neutralized PAAS has the following chemical structure where the amounts of H and Na depend on the degree of neutralization:

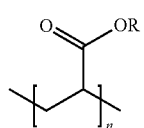

Partially neutralized PAAS
R = H or Na

Poly(methacrylic acid), also referred to as PMAA, is a homopolymer of methacrylic acid monomers. As for PAA, some or all of the pendant acid groups may be neutralized by adding a metal cation. Salts of PMAA may also be fully or partially neutralized.

An example of a salt of poly(methacrylic acid) is poly(methacrylic acid sodium salt).

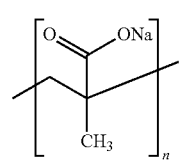

Sodium salt of PMAA

The partially or fully neutralized salts of poly(acrylic acid) or poly(methacrylic acid) may comprise linear or branched polymer chains.

The partially or fully neutralized salts of poly(acrylic acid) or poly(methacrylic acid) may have an average weight molecular weight (mass average molar mass; $M_w$) of about 1000 to 100000 g/mol and a molecular weight distribution within the range of from 1 to 3.5.

Moreover, the partially neutralized salts of poly(acrylic acid) or poly(methacrylic acid) may also be partially crosslinked by crosslinking agents, such as di- and tri-acrylates.

The flame retardant additive as disclosed herein may comprise a partially or fully neutralized salt of partially crosslinked poly(acrylic acid). The partially or fully neutralized salt of partially crosslinked poly(acrylic acid) may have di-, tri- and tetra-functionality.

The flame retardant additive as disclosed herein may comprise a partially neutralized salt of partially crosslinked poly(methacrylic acid).

Thus, the poly((meth)acrylic acid) for use in the flame retardant additive as disclosed herein may have different degrees of cross-linking, different degrees of neutralization and different structures. The poly((meth)acrylic acid) may either be synthesized with tailor-made structure or commercially available products may be used.

The halogen-free flame retardant additive as disclosed herein may comprise:

(i) a phosphorous-nitrogen-containing component containing amine and/or ammonium groups;

(ii) at least one (meth)acrylic acid homopolymer selected from the group consisting of a partially or fully neutralized salt of poly((meth)acrylic acid) and a partially or fully neutralized salt of a partially crosslinked poly((meth)acrylic acid); and (iii) a partially or fully neutralized salt of a copolymer of an olefin, such as ethylene, and (meth)acrylic acid comprising at least 10% by weight of (meth)acrylic acid repeating units.

When at least one (meth)acrylic acid homopolymer selected from the group consisting of a partially or fully neutralized salt of poly((meth)acrylic acid) and a partially or fully neutralized salt of a partially crosslinked poly((meth)acrylic acid) is present in the flame retardant additive as disclosed herein, the partially or fully neutralized salt of copolymer of an olefin and (meth)acrylic acid may comprise at least 10% by weight, such as at least 15% by weight of (meth)acrylic acid repeating units, such as at least 30% or at least 40% or even at least 50% by weight of (meth)acrylic acid repeating units.

The copolymer may be a graft copolymer. Graft copolymers are branched copolymers in which the side chains are structurally distinct from the main chain.

In particular, the copolymer may be a non-graft copolymer.

It has been found that the presence of a partially or fully neutralized salt of a copolymer of an olefin, such as ethylene, and (meth)acrylic acid in the flame retardant additive improves the compatibility of the flame retardant additive with the base polymer, such as polyolefins. The flame retardant, mechanical and rheological properties are thereby improved.

In particular, the halogen-free flame retardant as disclosed herein may comprise a partially neutralized salt of a copolymer of an olefin, such as ethylene, and (meth)acrylic acid.

The partially neutralized salt of the copolymer of olefin, such as ethylene, and (meth)acrylic acid may have a neutralization degree within the range of from 5% to 100%, such as within the range of from within the range of from 50% to 90% or from 70% to 90% or from 80% to 90%.

Examples of suitable copolymers are poly(ethylene-co-acrylic acid), also referred to as EAA, and poly(ethylene-co-methacrylic acid), also referred to as EMAA.

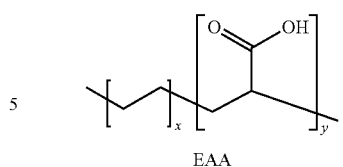

EAA

In a similar manner as for PAA and PMAA, some or all of the pendant acid groups of these copolymers may be neutralized by mono-, di- or multivalent cations, in particular metal cations, such as sodium, calcium, magnesium, potassium and zinc ions. Salts of these copolymers may be fully or partially neutralized.

Examples of suitable salts of copolymers of olefin and (meth)acrylic acid are poly(ethylene-co-acrylic acid) zinc salt, poly(ethylene-co-acrylic acid sodium salt), poly(ethylene-co-methacrylic acid zinc salt) and poly(ethylene-co-methacrylic acid sodium salt).

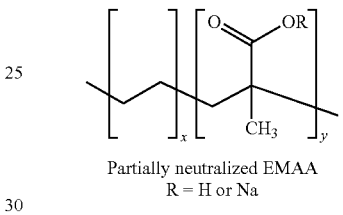

Partially neutralized EMAA
R = H or Na

Specific examples of such copolymers are partially neutralized poly(ethylene-co-acrylic acid sodium salt) and partially neutralized poly(ethylene-co-methacrylic acid zinc salt).

The partially or fully neutralized salt of a copolymer of an olefin and (meth)acrylic acid may comprise within the range of from 10% to 50% by weight, such as from 15% to 50% by weight, of (meth)acrylic acid, based on the total weight of the copolymer.

The flame retardant additive as disclosed herein may comprise a partially or fully neutralized salt of a copolymer of an olefin and (meth)acrylic acid, the copolymer being an ionomer.

The partially or fully neutralized salt of a copolymer of an olefin and (meth)acrylic acid may comprise linear or branched polymer chains.

The partially or fully neutralized salt of the copolymer of an olefin and (meth)acrylic acid may have an average weight molecular weight (mass average molar mass, $M_w$) of about 1500 to 100000 g/mol and a molecular weight distribution within the range of from 1 to 3.5.

Moreover, the partially or fully neutralized salt of a copolymer of an olefin and (meth)acrylic acid may also be partially crosslinked by crosslinking agents, such as di- or multifunctional acrylates.

The flame retardant additive as disclosed herein may comprise a partially or fully neutralized salt of partially crosslinked a copolymer of an olefin and (meth)acrylic acid.

Thus, the copolymers of olefins and (meth)acrylic acid for use in the flame retardant additive as disclosed herein may have different degrees of cross-linking, different degrees of neutralization and different structures. The copolymers may either be synthesized with tailor-made structure or commercially available products may be used.

The phosphorous-nitrogen-containing component (herein also called the P—N component) may comprises one or more phosphorous-nitrogen-containing compounds selected from the group consisting of phosphoric acid derivatives containing amine and/or ammonium groups, phosphonic acid derivatives containing amine and/or ammonium groups, phosphinic acid derivatives containing amine and/or ammonium groups, and any combinations thereof.

The phosphorous-nitrogen-containing component may comprise phosphate esters containing amine and/or ammonium groups or phosphate salts containing amine and/or ammonium groups.

The phosphorous-nitrogen-containing component may comprise phosphonates containing amine and/or ammonium groups.

The phosphorous-nitrogen-containing component may comprise phosphinates containing amine and/or ammonium groups.

Examples of such phosphorous-nitrogen-containing compounds are ammonium polyphosphate, ethylene diamine phosphate, melamine phosphate, melamine polyphosphate, melamine pyrophosphate, dimelamine pyrophosphate and piperazine phosphate.

Ammonium polyphosphate is a salt of polyphosphoric acid and ammonia.

Some generic structures of such phosphorous-nitrogen-containing compounds are disclosed below:

Ammonium polyphoshate

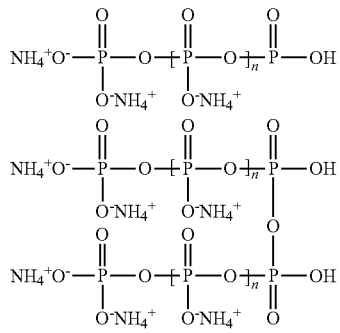

Ethylenediamine phosphate (EDAP)

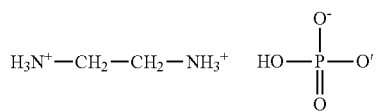

Melamine phosphate

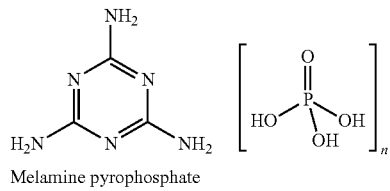

Melamine pyrophosphate

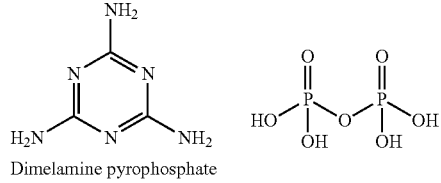

Dimelamine pyrophosphate

Melamine polyphosphate

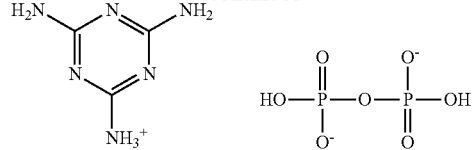

Piperazine phosphate

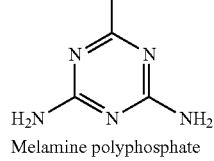

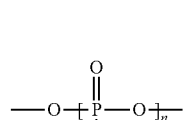

Alternatively, the phosphorous-nitrogen-containing component (the P—N component) may comprise:
(i) one or more phosphorous-containing compounds selected from the group consisting of phosphoric acid derivatives, phosphonic acid derivatives, phosphinic acid derivatives and any combinations thereof; and
(ii) one or more nitrogen-containing compounds containing amine and/or ammonium groups.

Examples of such phosphorous-containing compounds are pentaerythritol diphosphonate compounds of Formula Ia

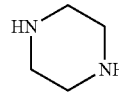 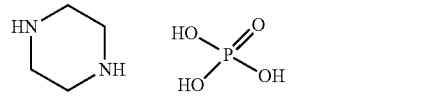

Formula Ia

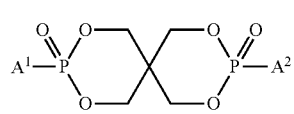

wherein each of $A^1$ and $A^2$ independently is selected from the group consisting of $C_{1-4}$ alkyl, benzyl, phenyl and naphtyl.

In particular, $A^1$ and $A^2$ of Formula Ia may be the same. In such case, the phosphorous-containing compounds may be pentaerythritol diphosphonate compounds of Formula Ib Formula Ib

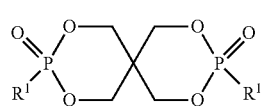

wherein $R^1$ is selected from the group consisting of $C_{1-4}$ alkyl, benzyl, phenyl and naphtyl.

Specific examples of pentaerythritol diphosphonate compounds of Formula Ib are pentaerythritol diphosphonate compounds are dimethyl pentaerythritol diphosphonate, dibenzyl pentaerythritol diphosphonate, diphenyl pentaerythritol diphosphonate and dinaphtyl pentaerythritol diphosphonate.

Phosphoric acid derivatives may be phosphates or phosphate esters, optionally containing amine and/or ammonium groups.

Phosphonic acid derivatives may be phosphonates, optionally containing amine and/or ammonium groups.

Phosphinic acid derivatives may be phosphinates, optionally containing amine and/or ammonium groups. Phosphinates may include metal ions, such as aluminium.

Some examples of useful phosphorous-containing compounds are illustrated by the generic structures below:

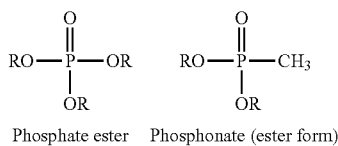

Phosphate ester    Phosphonate (ester form)

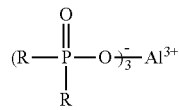

Phosphinate (salt form)

A specific example of useful phosphoric acid derivatives, such as phosphate esters, is ammonium polyphosphate.

A specific example of a useful phosphonic acid derivative (phosphonate) is ethylenediamine phosphate (EDAP).

A specific example of useful phosphinic acid derivative (phosphinate) is aluminum triphosphates.

Examples of nitrogen-containing compounds containing amine and/or ammonium groups are 1,3,5-triazine derivatives; including cyanuric acid derivatives, and fused triazine rings.

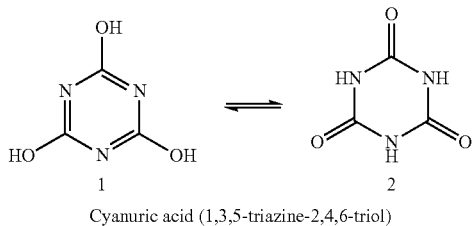 [SMILES: Oc1nc(O)nc(O)n1 ; O=c1[nH]c(=O)[nH]c(=O)[nH]1]

Cyanuric acid (1,3,5-triazine-2,4,6-triol)

Specific examples of nitrogen-containing compounds containing amine and/or ammonium groups are melamine, melem, 1,3,5-trihydroxyethyl-isocyanurate, and melamine cyanurate.

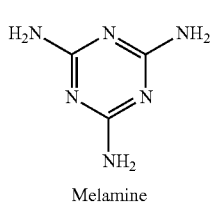
Melamine

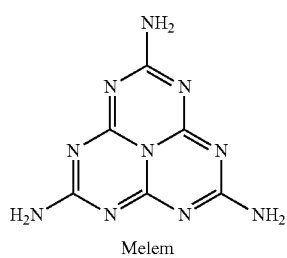
Melem

-continued 1,3,5-trihydroxyethyl-isocyanurate

Melamine cyanurate (MC)

The flame retardant additive as disclosed herein may further also comprise flame retardant minerals, such as aluminium trihydrate (ATH), magnesium hydroxide (MDH), boehmite (an aluminium oxide hydroxide), nanoclays, combinations of hydromagnesite and huntite (HMH) (e.g. UltraCarb as supplied by LKAB), and any combinations thereof The flame retardant additive as disclosed herein may further also comprise flame retardant borates, such as zinc borate.

The flame retardant additive as disclosed herein may further also comprise a polyol, such as monopentaerythritol (monopenta-E) and/or dipentaerythritol (di-penta-E).

The polyol may be added in an amount corresponding to within the range of from 5 to 20% by weight of the phosphorous-nitrogen-containing component of the flame retardant additive as disclosed herein.

When the phosphorous-nitrogen-containing component comprises one or more phosphorous-containing compounds and one or more nitrogen-containing compounds as disclosed herein, the polyol may be added in an amount corresponding to within the range of from 5 to 20% by weight of the phosphorous-containing compound(s) of the phosphorous-nitrogen-containing component. The ratio between poly((meth)acrylic acid and phosphorous-nitrogen-containing component of the flame retardant additive as disclosed herein may be within the range of from 1:10 to 1:60, such as within the range of from 1:13 to 1:22, based on % by weight.

The ratio between the combined weight percent of poly((meth)acrylic acid and the acrylic acid copolymer and the weight percent of phosphorous-nitrogen-containing component of the flame retardant additive as disclosed herein may be within the range of from 1:6 to 1:22, such as within the range of from 1:7 to 1:14, based on % by weight.

The phosphorous-nitrogen-containing component of the flame retardant additive as disclosed herein may comprise within the range of from 0.1% to 35% by weight of phosphorous, such as within the range of from 15% to 30% by weight of phosphorous, based on the weight of the phosphorous-nitrogen-containing component.

The phosphorous-nitrogen-containing component of the flame retardant additive as disclosed herein may comprise within the range of from 0.1% to 70% by weight of nitrogen, such as within the range of from 4% to 67% by weight of nitrogen, based on the weight of the phosphorous-nitrogen-containing component.

The flame retardant additive as disclosed herein may be added to one or more polymers, such as polyolefins, in an amount providing within the range of from 0.5% to 40% by weight, based on the total weight of the resulting polymer composition, of flame retardant additive.

In particular, the resulting flame retardant composition may comprise within the range of from 5% to 40% by weight, based on the total weight of the polymer composition, of flame retardant additive and within the range of from 60% to 95% by weight, based on the total weight of the resulting polymer composition, of polymer, such as polyolefin (e.g. polypropylene or polyethylene).

The flame retardant polymer composition as disclosed herein may comprise within the range of from 0.2% to 10% by weight, such as from 0.2% to 5% by weight or from 0.2 to 3% by weight, based on the total weight of the resulting polymer composition, of the salt of poly(meth)acrylic acid.

The flame retardant polymer composition as disclosed herein may comprise within the range of from 0.2 to 10% by weight, such as from 0.5 to 3% by weight or from 2% to 5% by weight, based on the total weight of the resulting polymer composition, of the salt of copolymer of olefin and (meth) acrylic acid.

The flame retardant polymer composition as disclosed herein may comprise within the range of from 0.01% to 12% by weight, such as from 0.3% to 7% or from 2% to 7% or from 3% to 7%, based on the total weight of the resulting polymer composition, of phosphorus deriving from the phosphorus-nitrogen-containing component of the flame retardant additive as disclosed herein.

The flame retardant polymer composition as disclosed herein may comprise within the range of from 0.01% to 10% by weight, such as from 0.05% to 8% or from 1% to 8% or from 3% to 8%, based on the total weight of the resulting polymer composition, of nitrogen deriving from the phosphorus-nitrogen-containing component of the flame retardant additive as disclosed herein.

The flame retardant polymer composition as disclosed herein may further comprise within the range of from 10% to 60% by weight, such as from 20% to 60% by weight or from 40% to 60% by weight or from 50% to 60% by weight, based on the total weight of the resulting polymer composition, of flame retardant mineral, such as ATH or MDH.

Unexpected flame retardant properties may be obtained by use of the flame retardant additive as disclosed herein. In particular, both the condensed-phase and the gas-phase reactions in the polymer materials may be controlled in a novel way during the burning process. Without being bound by any theory, probable reaction mechanisms resulting into the desired reactions and effects are summarized in the section below.

Multivalent cations in the minerals, when used in the flame retardant additive as disclosed herein, surprisingly exhibited to form physical cross-linking by forming ionomers between the carboxylic functionality of the polymers containing acrylic acid and minerals and thereby further reducing the dripping and heat release. When minerals were added to the flame retardant additive as disclosed herein, surprisingly good flame retardant properties were obtained by controlling both the gas-phase and the condensed phase and also using the diluting influence of the combustible gases.

Suggested Reaction Mechanisms

Unexpected flame resistance properties of polymer materials were obtained when the flame retardant additive as disclosed herein were mixed with the polymer at different concentrations, such as within the range of from 0.5% to 40% by weight of the total weight of the resulting polymer composition. These flame retardant additives may either be added directly to the base polymer, the flammability of which should be reduced, or it may be compounded as concentrate; concentrates are often termed as masterbatches.

Since no studies or investigations could be found in the literature on how different phosphorus derivatives functions as flame retardants when they are used together with the poly((meth)acrylic acid) and how do they mechanistically function, it was important for us to understand the underlying reaction mechanisms which may be favorable to obtain good fire-resistance properties.

Main advantages of using poly((meth)acrylic acid) together with one or more phosphorous-nitrogen-containing component instead of using the phosphorous-nitrogen-containing component alone was that flame retardant compositions could be designed to meet the fire resistance requirements for several types of polymers without significantly affecting the properties of the base polymer and thus obtaining desired mechanical and rheological properties of the final polymer materials or products.

In order to understand the reaction mechanisms implied by the flame retardant additive as disclosed herein upon burning of a polymer composition containing the additive, we performed extensive structural characterization using techniques such as TGA, FTIR, GC/MS. We characterized both the condensed and the gas phase under burning conditions and could observe formation of aromatic rings and double bonds in the condensed phase and radicals in the gas phase.

Based on our studies, the degradation mechanism shown in Scheme 4 is proposed for P—N derivatives in the presence of poly((meth)acrylic acid) and/or copolymers containing (meth)acrylic acid:

Scheme 4: Degradation of P-N derivatives in presence of polymers containing (meth)acrylic acid

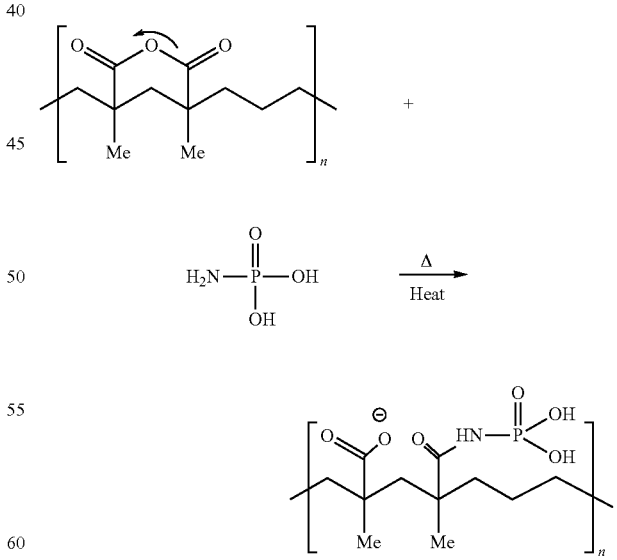

This reaction is irreversible and the formed amide is stable and the carboxylic anion formed will not be able to form the cyclic anhydride in a retro fashion. Reactions taking place both in the condensed phase and the gas phase may be illustrated as in Scheme 5 below:

Scheme 5: Possible reaction mechanisms illustrating the complete degradation behavior

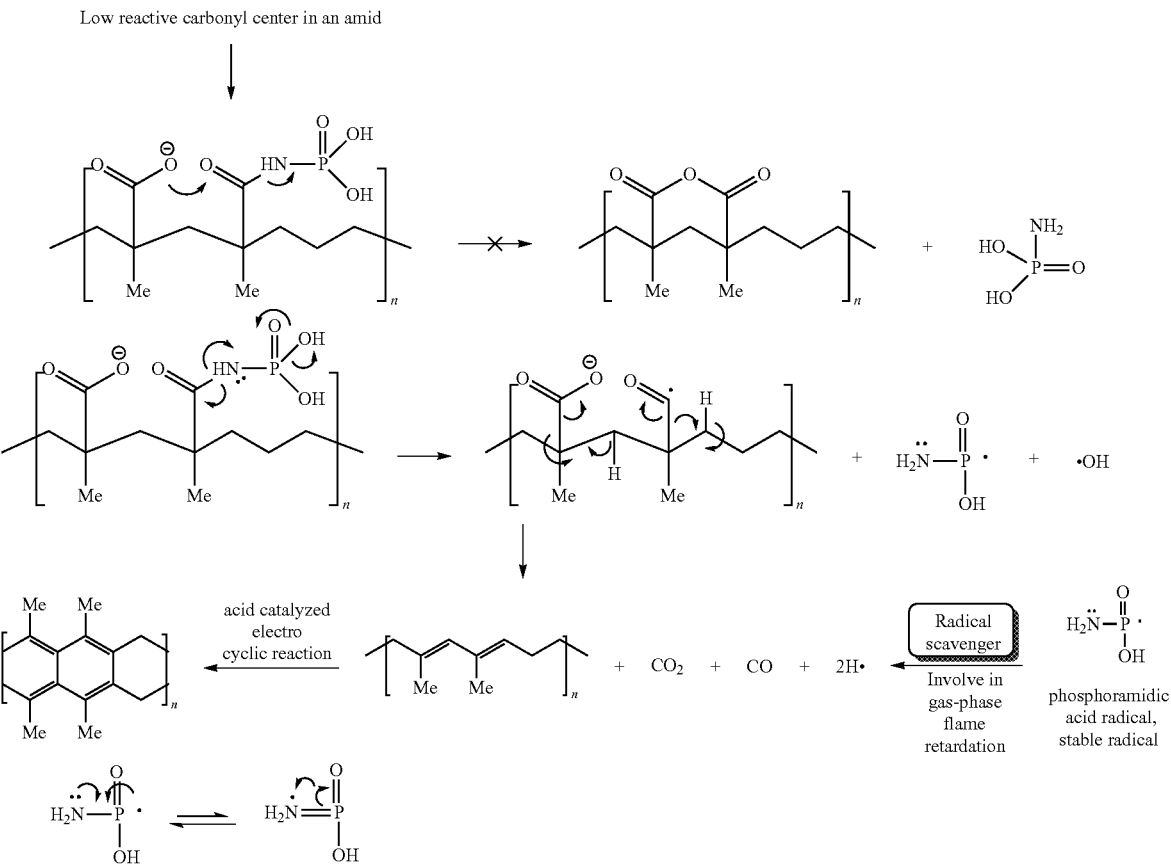

The above scheme shows that the P—N-component plays a very important role both for the condensed and the gas phases through the formation of phosphorimidate intermediates. Gas phase reactions are important in order to obtain self-extinguishment of the flames.

So far the gas-phase reactions are concerned; all polymeric materials undergo pyrolysis, as shown earlier, and thereby form combustible gases. These gases form hydrogen and hydroxyl radicals, which in turn, may subsequently react with oxygen as below:

$$H^- + O_2 \rightarrow OH^- + O^- \quad (1)$$

$$O^- + H_2 \rightarrow OH + H^- \quad (2)$$

The main exothermic reaction in the burning process generating large amounts of heat is assigned mainly due to the reaction of hydroxyl radicals with carbon monoxide as below:

$$OH^- + CO \rightarrow CO_2 + H^- \quad (3)$$

This suggests that in order to reduce the amount of heat generated, which is one of the main factor to stop the burning process and the flash over is essentially to quench the hydroxyl radicals formed according to reaction 3.

As shown in Scheme 5 above, poly((meth)acrylic acid), and co-polymers containing acrylic acid, together with the P—N component is believed to play an important role in controlling the fire-resistance properties of the final flame retardant polymer composition.

Phosphorus-containing compounds are mainly used as a source to generate non-volatile acids, which are necessary to obtain the desired fire-resistance properties as shown above. As evident from the above mechanisms, P-derivatives require oxygen in order to be effective and when the oxygen content in the material decreases their efficiency as flame retardant also decreases. Since P-derivatives also influence the gas phase reactions, their volatility and their efficiencies to generate PO radicals play a very important role in order to function as an effective radical quencher.

Formation of PO radicals through formation of phosphoric acid from P-derivatives and their reactions with OH radicals are summarized as below:

Scheme 6: Reaction mechanisms for P-derivatives

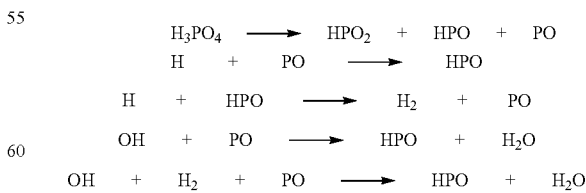

Presence of small molecular species such as PO, $HPO_2$, $PO_2$ and $P_2$ in the flame could be identified using mass spectroscopy (MS). Spectroscopic studies also showed that concentration of H-atoms in the flame decreased in presence of P-containing species. Since H-atom concentration is the rate controlling step in the burning processes, its decrease favours the reduction of generated heat and quenching of the flame.

In a recent study Yong et al 2010 (Chinese Journal of Chemical Engineering. 18(5), 711-720) showed influence of P-containing compounds on the flame inhibition of propane/air combustion and constructed a level of importance (LOI) method. Flame inhibition was predicted based on the proposed reactions according to Scheme 6 above.

Apart from the presence of these structural units to obtain the optimum flame retardant properties, compatibility of the flame retardant additive with the base polymer, the flammability of which should be reduced, is of utmost importance. Poor compatibility of the flame retardant additive deteriorates the mechanical properties of the final flame retarded products. Homogeneous material blends are not only important to obtain good mechanical properties but also are important to obtain optimum flame retardant properties at lowest concentration of additives.

Our investigations have shown that the decomposition temperatures of the P—N component and the degradation products formed in the presence of poly((meth)acrylic acid), and co-polymers containing (meth)acrylic acid, are important in order to attain an effective flame retardant additive as disclosed herein.

Characterizations of the flame retardant additives as disclosed herein and flame retardant compositions as disclosed herein using techniques such as TGA, FTIR, and SEM/EDS and measurements of the mechanical and fire properties on products made using flame retardant compositions as disclosed herein have been made.

EXAMPLES

All exemplary compositions contained poly(acrylic acid sodium salt), partially neutralized. This poly(acrylic acid sodium salt) is referred to as PAA in Tables 1-6.

Some exemplary compositions also contained poly(ethylene-co-methacrylic acid) zinc salt, partially neutralized (Surlyn® 1705-1, supplied by DuPont) or poly(ethylene-co-acrylic acid sodium salt), partially neutralized (Escor™ 5200, supplied by ExxonMobil).

Surlyn® 1705-1 is a methacrylic acid copolymer containing 15% w/w zinc salt (partially neutralized) of methacrylic acid. This poly(ethylene-co-methacrylic acid) zinc salt is referred to as EMAA in Table 1.

Escor™ 5200 is an acrylic acid copolymer containing 15% w/w sodium salt of acrylic acid. This poly(ethylene-co-acrylic acid) sodium salt is referred to as EAA in Table 1.

The base polymer of all compositions was polypropylene (PP), BC245 supplied by Borealis. The PP had a MFI of 3.5 g/10 min at 230° C./2.16 kg according to ISO 1133.

Different types of one or more commercially available products containing phosphate or phosphonate groups and amine and/or ammonium groups, in accordance with Examples 1-5 described below, were included in the compositions. These products are referred to as P/N-product in Tables 1-5.

All compositions were prepared by dry-blending the ingredients in a twin-screw lab extruder and granulates were obtained by extruding the resulting mixture into strands, cooling the strands in a water bath followed by pelletizing. All compounding was performed at a temperature within the range of from 130 to 200° C. Sample strips (125 mm×13 mm) with required thicknesses (2 mm or 3.2 mm for the vertical test and 1.6 mm for the horizontal test) were produced by either hot pressing or injection molding for fire testing.

Fire tests of at least 5 sample strips of each the exemplary composition and reference composition were performed according UL94, the Standard for Safety of Flammability of Plastic Materials for Parts in Devices and Appliances testing released by Underwriters Laboratories of the USA, in vertical and horizontal orientations using a 50 W flame for 10 seconds for vertical tests and 30 seconds for horizontal tests. Vertical tests (i.e. sample held in a vertical position) are represented by V and horizontal tests (i.e. sample held in a horizontal position) by HB in Table 1. For the vertical tests, the flame was withdrawn after 10 seconds and the burning time (i.e. duration of flaming before extinguishment) and the time to start dripping of melt were recorded after this first ignition. When flaming ceased, the flame was reapplied for 10 seconds and the burning time and the time to start dripping were again recorded after this second ignition. The results presented in Tables 1-5 below are the average value from the first and second ignition measurements of at least 5 sample stripes per composition.

The UL94 standard includes the following classifications:

| | |
|---|---|
| HB | Slow burning on a horizontal specimen; burning rate <76 mm/min for thickness <3 mm or burning stops before 100 mm. |
| V-2 | Burning stops within 30 seconds on a vertical specimen; drips of flaming particles are allowed. |
| V-1 | Burning stops within 30 seconds on a vertical specimen; drips of particles allowed as long as they are not inflamed. |
| V-0 | Burning stops within 10 seconds on a vertical specimen; drips of particles allowed as long as they are not inflamed |
| 5VB | Burning stops within 60 seconds on a vertical specimen; no drips allowed; plaque specimens may develop a hole. |
| 5VA | Burning stops within 60 seconds on a vertical specimen; no drips allowed; plaque specimens may not develop a hole. |

Example 1

Varying compositions comprising ammonium polyphosphate (APP) were prepared.

The exemplary compositions were prepared using the commercially available products APP-204, supplied by WTH, and Afflamit® PPN 978, supplied by Thor GmbH.

Both these products comprise, according to the suppliers, APP.

According to information provided by the suppliers, APP-204 contains only APP and Afflamit® PPN 978 is said to be a multicomponent blend based on APP and further comprising a nitrogen synergist.

TABLE 1

| Example (P/N-product) | PP (wt %) | P/N-product (wt %) | PAA (wt %) | EMAA (wt %) | Test | Time to start of dripping |
|---|---|---|---|---|---|---|
| Example 1.1 (WTH, APP 204) | 83 | 15 | 0.6 | 1.4 | UL94V (3.2 mm) | 16 s |

TABLE 1-continued

| Example (P/N-product) | PP (wt %) | P/N-product (wt %) | PAA (wt %) | EMAA (wt %) | Test | Time to start of dripping |
|---|---|---|---|---|---|---|
| Ref. 1.1 (WTH, APP 204) | 85 | 15 | — | — | UL94V (3.2 mm) | 5.5 s |
| Ref. 1.2 (WTH, APP 204) | 83.6 | 15 | — | 1.4 | UL94V (3.2 mm) | 5 s |
| Example 1.2 (Afflamit 978) | 84 | 15 | 1 | — | UL94V (3.2 mm) | 15 s |
| Ref. 1.3 | 85 | 15 | — | — | UL94V (3.2 mm) | 4.5 s |
| Example 1.3 (Afflamit 978) | 89 | 10 | 0.5 | 0.5 | UL94HB (1.6 mm) | 37 s |
| Ref. 1.4 (Afflamit 978) | 90 | 10 | — | — | UL94HB (1.6 mm) | 28 s |
| Ref. 1.5 | 100 | — | — | — | UL94HB (1.6 mm) | 22 s |

As seen in Table 1, the composition of Example 1.1 (APP-204+PAA+EMAA) provides an increased time to start of dripping in comparison to Reference 1.1 (APP 204) and Reference 1.2 (APP-204+EMAA).

As further seen in Table 1, the composition of Example 1.2 (Afflamit 978+PAA) provides an increased time to start of dripping in comparison to Reference 1.3 (Afflamit 978).

As further seen in Table 1, the composition of Example 1.3 (Afflamit 978+PAA+EMAA) provides an increased time to start of dripping in comparison to Reference 1.4 (Afflamit 978).

Table 1 also contains the time to start dripping for PP without any flame retardant (Ref. 1.5) additives as measured using UL94HB (1.6 mm).

These results show that addition of PAA, alone or together with EMAA, improves the dripping behavior of this type of compositions.

Example 2

Varying compositions comprising a pentaerythritol diphosphonate compound of Formula Ib, as disclosed herein above, together with melamine cyanurate (MC) were prepared.

The exemplary compositions were prepared using the commercially available product Afflamit® PCO 900, supplied by Thor GmbH and the commercially available product Melapur®, supplied by BASF.

According to information provided by the supplier, Afflamit® PCO 900 contains 20-24% by weight phosphorous. It is based on chemical analysis assumed that the product lacks nitrogen.

According to information provided by the supplier, Melapur® contains melamine cyanurate (MC). Since melamine cyanurate is a condensation product of melamine and trihydroxy triazine, the nitrogen content may vary depending on the degree of polymerization. No information on the nitrogen content has been found.

TABLE 2

| Example (P/N-product) | PP (wt %) | P/N-product (wt %) | PAA (wt %) | EMAA (wt %) | Test | Time to start of dripping |
|---|---|---|---|---|---|---|
| Example 2.1 (PCO 900 + MC) | 87.3 | 9 + 2.7 | 1.0 | — | Modified UL94VTM (0.2 mm film) | 26 s |
| Example 2.2 (PCO 900 + MC) | 87.3 | 9 + 2.7 | 0.5 | 0.5 | Modified UL94VTM (0.2 mm film) | 29 s |
| Ref 2.1 (PCO 900 + MC) | 87.8 | 9 + 2.7 | — | 0.5 | Modified UL94VTM (0.2 mm film) | 23 s |
| Ref 2.2 (PCO 900) | 88 | 9 | — | 3 | Modified UL94VTM (0.2 mm film) | No dripping |
| Ref. 2.3 (PCO 900) | 91 | 9 | — | — | Modified UL94VTM (0.2 mm film) | Continuous dripping after 2$^{nd}$ ignition |
| Ref. 2.4 (PCO 900 + MC) | 88.3 | 9 + 2.7 | | | Modified UL94VTM (0.2 mm film) | Continuous dripping after 2$^{nd}$ ignition |

As seen in Table 2, each of the compositions according to Example 2.1 (PCO 900+MC+PAA) and Example 2.2 (PCO 900+MC+PAA+EMAA) provides an increased time to start of dripping in comparison to Reference 2.1 (PCO 900+MC+EMAA).

Interestingly, even though the composition of Ref 2.2 contains a copolymer, EMAA, having only 15% w/w of partially neutralized methacrylic acid units and no (meth) acrylic acid homopolymer, the results show an improved dripping behavior in comparison to the composition of Ref 2.3.

These results show that addition of PAA, alone or together with EAA, improves the dripping behavior of this type of compositions.

Example 3

Varying compositions comprising piperazine phosphate together with melamine pyrophosphate and/or melamine were prepared.

The exemplary compositions were prepared using the commercially available product ADK Stab FP2200 supplied by Adeka.

According to information provided by the supplier, ADK Stab FP2200 contains 16-21% by weight of phosphorous.

TABLE 3

| Example (P/N-product) | PP (wt %) | P/N-product (wt %) | PAA (wt %) | EMAA (wt %) | Test | Time to start of dripping |
|---|---|---|---|---|---|---|
| Example 3.1 (ADK Stab FP-2200) | 83 | 15 | 1 | 1 | UL94V (3.2 mm) | No dripping. Passes V0 rating. |
| Ref. 3.1 (ADK Stab FP-2200) | 85 | 15 | — | — | UL94V (3.2 mm) | Drip. Passes only V1 rating. |
| Ref. 3.2 (ADK Stab FP-2200) | 83 | 17 | — | — | UL94V (2 mm) | Continuous dripping |

As seen in Table 3, the composition of Example 3.1 (ADK Stab FP-2200+PAA+EMAA) provides no dripping. In comparison, the composition of Reference 3.1 and 3.2 (ADK Stab FP-2200) do not pass any of the UL94V standards (3.2 mm) and Ref. 3.2 shows continuous dripping.

These results show that addition of PAA together with EMAA improves the dripping behavior of this type of compositions.

Moreover, the composition of Example 3.1 passed the V0 classification according to UL94 as mentioned above, whereas the composition of Reference 3.1 failed this classification.

Example 4

Varying compositions comprising ethylendiamine phosphate (EDAP) together with melamine cyanurate were prepared.

The exemplary compositions were prepared using the commercially available product Uniplex FRX-44-94S, supplied by Lanxess.

According to information provided by the supplier, Uniplex FRX-44 contains ethylendiamine phosphate (EDAP).

TABLE 4

| Example (P/N-product) | PP (wt %) | P/N-product (wt %) | PAA (wt %) | EMAA (wt %) | Test | Time to start of dripping |
|---|---|---|---|---|---|---|
| Example 4.1 (Uniplex FRX 44-94S) | 84 | 15 | 0.45 | 0.45 | UL94V (3.2 mm) | 29 s |
| Ref. 4.1 (Uniplex FRX 44-94S) | 85 | 15 | — | — | UL94V (3.2 mm) | 18 s |

As seen in Table 4, the composition of Example 4.1 (Uniplex FRX 44-94S+PAA+EMAA) provides an increased time to start of dripping in comparison to Reference 4.1 (Uniplex FRX 44).

These results show that addition of PAA together with EMAA improves the dripping behavior of this type of compositions.

Example 5

Varying compositions comprising piperazine phosphate, melamine pyrophosphate and/or melamine, ethylendiamine phosphate (EDAP) and melamine cyanurate (MC) were prepared.

The exemplary compositions were prepared using the above-mentioned commercially available product Uniplex FRX-44-94S, supplied by Lanxess, and the above-mentioned commercially available product ADK Stab FP2200, supplied by Adeka.

TABLE 5

| Example (P/N-product) | PP (wt %) | P/N-product (wt %) | PA (wt %) | EMAA (wt %) | Test | Time to start of dripping |
|---|---|---|---|---|---|---|
| Example 5.1 (ADK Stab FP-2200) + Uniplex FRX 44-94S) | 82 | 12 + 5 | 0.5 | 0.5 | UL94V (2 mm) | No dripping |
| Ref. 5.1 (ADK Stab FP-2200) | 83 | 17 | — | — | UL94V (2 mm) | Continuous dripping |
| Ref. 5.2 (ADK Stab FP-2200) + Uniplex FRX 44-94S) | 83 | 12 + 5 | — | — | UL94V (2 mm) | Continuous dripping |

As seen in Table 5, the composition of Example 5.1 (ADK Stab FP-2200+Uniplex FRX44-945+PAA+EMAA) provides no dripping whereas the composition of Reference 5.1 (ADK Stab FP-2200+Uniplex FRX44) provides continuous dripping.

These results show that addition of PAA together with EMAA improves the dripping behavior of this type of compositions.

Moreover, the composition of Example 5.1 passed the V0 classification according to UL94 as mentioned above, whereas the compositions of Reference 5.1 and 5.2 failed this classification.

As evident from the results of Examples 1-5, the exemplary compositions as disclosed herein show an unexpected improvement on the burning behavior of the disclosed polypropylene compositions.

Example 6

Similar types of evaluations were also performed with polyethylene (PE), ethylene vinylacetate (EVA) and other polar olefin polymers with similar results.

Example 7

In order to obtain good burning behavior, compatibility of the components with the base polymer is very important. All the components should be fully compatible and should not form any discrete phases in order to obtain both good mechanical and fire resistance properties.

Compatibility evaluations were performed by Scanning Electron Microscope (SEM)/X-ray diffraction energy dispersive spectroscopy (EDS). Compatibility of the components were measured both from SEM pictures at magnifications of more than ×5000 and by EDS. No phase separation was observed in the SEM pictures. In order to confirm the compatibility further, elemental mapping by using EDS where performed and a uniform distribution of phosphorous and metal ions from the PAA and EMAA was observed.

Mechanical properties were measured by using a tensile tester using 30 kN load cell according to ISO 527-2 standard for tensile testing. Impact testing was performed according to izod testing according to ISO 180 both at the room and freezing temperatures, such as from −10 to −25° C.

Fire and smoke properties were also measured using Cone calorimeter (CC) at 35 watt/m$^2$ according to British Standard 479: part 15.

Example 8

Poly(acrylic acid) together with (meth)acrylic copolymers were also found to show unexpected improved burning behavior when 0.2% by weight, based on the total weight of the polymer composition, of polyacrylic acid was used together with 2-5% by weight, based on the total weight of the polymer composition, of (meth)acrylic copolymers and 2-5% % by weight, based on the total weight of the polymer composition, of P—N component together with flame retardant minerals.

All the evaluated compositions contained 55% by weight, based on the total weight of the polymer composition, of flame retardant mineral, such as ATH or MDH.

Compositions comprising flame retardant additives as disclosed herein passed the V0 classification without forming any drops, which is normally obtained at a level of 65% by weight of these minerals. Thus, these results revealed that flame retardant additives as disclosed herein passed V0 classification at much lower levels of minerals and with much lesser dripping and improved burning results.

Similar improvements were obtained with either ATH or MDH.

Example 9

Compositions comprising poly(acrylic acid) and ammonium polyphosphate (APP), type I and type II, were shown to provide unexpected fire properties of coatings. Aflamit® PPN 978, supplied by Thor GmbH, was used.

Water borne coatings based on acrylic resin dispersions, AC2403 supplied by Alberdingk, were formulated as described in Table 6 and applied on a wood substrate two times using a brush and allowed to dry at room temperature at a relative humidity of 50% for one week. Some of the compositions also contained silica dispersion, Bindzil supplied by Akzo Nobel.

Fire testing was performed by exposing the coated surface to a 50 W flame. Flame was applied for 10 seconds at an angle of 45° and the flame was placed 0.5 cm from the lower end of coating. The length and the breadth of the tested coating was 12.5 and 6 cm respectively. The time for the flame to propagate to top end of the coating was measured.

Several time parameters were measured to measure the fire resistance and the fire spread behavior for different compositions. The fire results are summarized in Table 7.

TABLE 6

| Composition | AC 2403 (g) | Bindzil (phr*) | Polyacrylic acid (phr*) | APP (phr*) |
|---|---|---|---|---|
| Ref. 9.1 | 50 | — | — | — |
| Ref. 9.2 | 50 | 2 | — | — |

TABLE 6-continued

| Composition | AC 2403 (g) | Bindzil (phr*) | Polyacrylic acid (phr*) | APP (phr*) |
|---|---|---|---|---|
| Ref. 9.3 | 50 | — | — | 4.2 |
| Example 9.1 | 50 | — | 2 | — |
| Example 9.2 | 50 | — | 2 | 4.2 |
| Example 9.3 | 50 | 2.5 | 2 | 4.2 |

*parts per hundred of dispersion

TABLE 7

| | Compositions | | | | | |
|---|---|---|---|---|---|---|
| | Ref. 9.1 | Ref. 9.2 | Ref. 9.3 | Ex. 9.1 | Ex. 9.2 | Ex. 9.3 |
| Time for fire to reach the top of the coating (s) | 40 | 56 | 43 | 52 | >60 (does not reach top) | 50 |
| Self extinguishing Y = yes N = no (seconds) | N | N | Y (33) | N | Y(0) | Y(16) |
| Time to reach sidelines from flame removal (seconds) | 107 | 112 | Does not reach sidelines | 120 | Does not reach sidelines | Does not reach sidelines |
| Width of the burnt surface (cm) | 9.0 | 8.4 | 2.5 | 7.0 | 2.1 | 2.7 |
| Rate of sidewise flame spread (mm/s) | 0.27 | 0.24 | — | 0.19 | — | — |

The results show that unexpected results are obtained when the flame retardant additives as disclosed herein is used for water-borne intumescent coatings.

We also found that the flame retardant additives as disclosed herein not only improves the fire properties in an unexpected way but also provides an advantage as rheological modifier for the final paint formulations.

Example 10

Varying compositions comprising melamine, ammonium polyphosphate (APP) and mono- or di pentaerythritol were prepared.

APP-204, supplied by WTH, melamine supplied by JLS, Penta Tech Grade supplied by Perstorp and Dipenta 93 supplied by Perstorp were used.

Reference sample 10.1 showed a drop-off time of 20-25 sec whereas none of the other samples containing acrylic acid polymers showed any dripping. Moreover the compositions of Example 10.2 and 10.3 surprisingly extinguished instantly as the flame was removed.

TABLE 8

| Example (P/N-product) | PP (wt %) | P/N-product (wt %) | PAA (wt %) | EMAA (wt %) | Mono- or di penta-E (wt %) | UL 94 Fire (3.2 mm) |
|---|---|---|---|---|---|---|
| Example 10.1 (APP + melamine) | 68 | 25 + 5 | 1 | 1 | | V0-V1 |
| Example 10.2 (APP + melamine) | 71.4 | 20 + 5 | 1 | 1 | 1.6 (mono) | V0 |
| Example 10.3 (APP + melamine) | 71.4 | 20 + 5 | 1 | 1 | 1.6 (di) | V0 |
| Ref 10.1 | 63 | 37 | — | — | | V2 |

The invention claimed is:

1. A halogen-free flame retardant additive for polymers, comprising
   (a) a phosphorous-nitrogen-containing component containing amine and/or ammonium groups; and
   (b) a (meth)acrylic acid homo- or co-polymer selected from the group consisting of a partially or fully neutralized salt of poly((meth)acrylic acid), a partially or fully neutralized salt of a partially crosslinked poly((meth)acrylic acid), a partially or fully neutralized salt of a copolymer of an olefin and (meth)acrylic acid comprising at least 50% by weight of (meth)acrylic acid repeating units, and any combinations of the foregoing polymers.

2. A halogen-free flame retardant additive according to claim 1, wherein said (meth)acrylic acid homo- or co-polymer is a (meth)acrylic acid homopolymer selected from the group consisting of a partially or fully neutralized salt of poly((meth)acrylic acid), a partially or fully neutralized salt of a partially crosslinked poly((meth)acrylic acid), and any combination thereof.

3. A halogen-free flame retardant additive according to claim 2, further comprising a partially or fully neutralized salt of a copolymer of an olefin and (meth)acrylic acid comprising at least 10% by weight of (meth)acrylic acid repeating units.

4. A halogen-free flame retardant additive according to claim 1, wherein the copolymer of an olefin and (meth)acrylic acid is selected from the group consisting of partially neutralized salts of poly(ethylene-co-acrylic acid) and partially neutralized salts of poly(ethylene-co-methacrylic acid).

5. A halogen-free flame retardant additive according to claim 1, wherein the partially or fully neutralized salt of poly((meth)acrylic acid) is a partially neutralized salt of poly(acrylic acid).

6. A halogen-free flame retardant additive according to claim 5, wherein the partially neutralized salt of poly(acrylic acid) is selected from the group consisting of a partially neutralized poly(acrylic acid sodium salt), a partially neutralized poly(acrylic acid calcium salt), a partially neutralized poly(acrylic acid magnesium salt), a partially neutralized poly(acrylic acid potassium salt), and a partially neutralized poly(acrylic acid zinc salt).

7. A halogen-free flame retardant additive according to claim 1, wherein the phosphorous-nitrogen-containing component comprises one or more phosphorous-nitrogen-containing compounds selected from the group consisting of phosphoric acid derivatives containing amine and/or ammonium groups, phosphonic acid derivatives containing amine and/or ammonium groups, phosphinic acid derivatives containing amine and/or ammonium groups, and any combinations thereof.

8. A halogen-free flame retardant additive according to claim 7, wherein said one or more phosphorous-nitrogen-containing compounds is selected from the group consisting of ammonium polyphosphate, ethylene diamine phosphate, melamine phosphate, melamine polyphosphate, melamine pyrophosphate, dimelamine pyrophosphate, piperazine phosphate and any combinations thereof.

9. A halogen-free flame retardant additive according to claim 7, wherein the phosphorous-nitrogen-containing component comprises one or more additional nitrogen-containing compounds containing amine and/or ammonium groups.

10. A halogen-free flame retardant additive according to claim 1, wherein the phosphorous-nitrogen-containing component comprises (i) one or more phosphorous-containing compounds selected from the group consisting of phosphoric acid derivatives, phosphonic acid derivatives, phosphinic acid derivatives and any combinations thereof; and (ii) one or more nitrogen-containing compounds containing amine and/or ammonium groups.

11. A halogen-free flame retardant additive according to claim 10, wherein said one or more phosphorous-containing compounds is a pentaerythritol diphosphonate compound of Formula

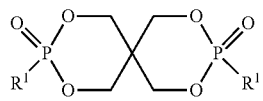

Formula I wherein $R^1$ is selected from the group consisting of $C_{1-4}$ alkyl, benzyl, phenyl and naphtyl.

12. A halogen-free flame retardant additive according to claim 9, wherein said one or more nitrogen-containing compounds containing amine and/or ammonium groups is selected from the group consisting of melamine, melem, 1,3,5-trihydroxyethyl-isocyanurate, melamine cyanurate, and any combinations thereof.

13. A halogen-free flame retardant additive according to claim 1, further comprising a flame retardant mineral.

14. A halogen-free flame retardant additive according to claim 13, wherein the flame retardant mineral is selected from the group consisting of aluminium trihydrate, magnesium hydroxide, boehmite, hydromagnesite and huntite, and any combinations thereof.

15. A halogen-free flame retardant additive according to claim 1, further comprising a polyol.

16. A halogen-free flame retardant additive according to claim 15, wherein the polyol is selected from the group consisting of pentaerythritol, dipentaerythritol and any combination thereof.

17. A halogen-free flame retardant polymer composition comprising at least one polymer and a flame retardant additive according to claim 1.

18. A halogen-free flame retardant polymer composition according to claim 17, wherein said at least one polymer is an olefinic polymer.

19. A halogen-free flame retardant polymer composition according to claim 17, wherein said at least one polymer is an acrylic polymer.

20. A method for reducing the flammability of a polymer, the method comprising adding a flame retardant additive according to claim 1 to the polymer.

21. A halogen-free flame retardant additive according to claim 1, wherein the flame retardant additive is for polyolefins.

22. A halogen-free flame retardant additive for polymers according to claim 1, wherein the flame retardancy is obtained by effect of that the carboxylic functionality in the poly(meth)acrylic acid, and in copolymers containing acrylic acid, together with a P—N component result in crosslinking of the back-bone chain of the base polymers.

* * * * *